United States Patent
Konishi et al.

(10) Patent No.: US 8,828,607 B2
(45) Date of Patent: Sep. 9, 2014

(54) CATHODE MATERIAL, CATHODE, AND LITHIUM ION SECONDARY BATTERY

(75) Inventors: Hiroaki Konishi, Hitachi (JP); Masanori Yoshikawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/359,759

(22) Filed: Jan. 27, 2012

(65) Prior Publication Data
US 2012/0219861 A1    Aug. 30, 2012

(30) Foreign Application Priority Data
Feb. 24, 2011  (JP) ................................. 2011-037732

(51) Int. Cl.
| | | |
|---|---|---|
| *H01M 4/13* | (2010.01) | |
| *H01M 10/0525* | (2010.01) | |
| *H01M 4/505* | (2010.01) | |
| *H01M 4/525* | (2010.01) | |

(52) U.S. Cl.
CPC .......... *H01M 4/525* (2013.01); *H01M 10/0525* (2013.01); *Y02T 10/7011* (2013.01); *H01M 4/505* (2013.01); *Y02E 60/122* (2013.01)
USPC ................ 429/231.5; 429/231.9; 429/231.95; 429/231.2; 429/231.3; 429/231.6

(58) Field of Classification Search
CPC . H01M 10/0525; H01M 4/505; H01M 4/525; Y02E 60/122; Y02T 10/7011
USPC ........ 429/231.9, 231.95, 231.2, 231.3, 231.5, 429/231.6
See application file for complete search history.

(56) References Cited

U.S. PATENT DOCUMENTS

2009/0035660 A1*  2/2009  Fujihara et al. ................ 429/223
2011/0129734 A1   6/2011  Konishi et al.

FOREIGN PATENT DOCUMENTS

| CN | 101931072 A | 12/2010 | |
|---|---|---|---|
| CN | 101967055 A | 2/2011 | |
| JP | 2000-323143 | 11/2000 | |
| JP | 2006-147500 | 6/2006 | |
| JP | 2006-332020 | 12/2006 | |
| JP | 2006-344567 | 12/2006 | |
| JP | 2007-188819 | * 7/2007 | .............. H01M 4/58 |
| JP | 2010-47466 | 3/2010 | |

OTHER PUBLICATIONS

Japanese Office Action dated Jun. 18, 2013 for Application No. 2011-037732.
Chinese Office Action dated Dec. 4, 2013 for Application No. 201210040325.3.
Chinese Office Action dated Mar. 31, 2014 for Application No. 201210040325.3.

* cited by examiner

*Primary Examiner* — Patrick Ryan
*Assistant Examiner* — Ben Lewis
(74) *Attorney, Agent, or Firm* — Antonelli, Terry, Stout & Kraus, LLP.

(57) ABSTRACT

It is an object to provide a cathode active material and a cathode which can attain a lithium ion secondary battery with high capacity and high security, and further to provide the lithium ion secondary battery with high capacity and high security.
According to the present invention, the cathode active material is represented by the following composition formula:

$$Li_{1.1+x}Ni_aM1_bM2_cO_2$$

wherein M1 represents Co, or Co and Mn; M2 represents Mo, W or Nb; $-0.07 \leq x \leq 0.1$; $0.6 \leq a \leq 0.9$; $0.05 \leq b \leq 0.38$; and $0.02 \leq c \leq 0.06$.

9 Claims, 1 Drawing Sheet

CATHODE MATERIAL, CATHODE, AND LITHIUM ION SECONDARY BATTERY

BACKGROUND OF THE INVENTION

1. Technical Field

The present invention relates to a cathode active material and a cathode for a lithium ion secondary battery, and the lithium ion secondary battery.

2. Background of the Invention

Patent Document 1 discloses a lithium transition metal oxide as a cathode active material in a lithium battery. This lithium transition metal oxide has a ratio of Li to the transition metal of 1.00 to 1.08.

A battery disclosed in Patent Document 2 uses a cathode and a separator to enhance elevated temperature properties, wherein the cathode comprises a cathode active material represented by the composition formula: $Li_fCo_gNi_hMn_jM1_kO_{(2-m)}X1_n$, wherein X1 is at least one selected from the group consisting F, Cl and Br, and each of f, g, h, j, k, m and n is a value in the range of $0.8 \leq f \leq 1.2$, $0 \leq g \leq 1$, $0 < h \leq 1$, $0 \leq j \leq 1$, $0 \leq k \leq 0.1$, $g+h+j+k=1$, $-0.1 \leq m \leq 0.2$, and $0 \leq n \leq 0.1$, and the like, and the separator is impregnated with an electrolyte comprising a cyclic carbonic ester derivative having a halogen atom.

A lithium ion secondary battery disclosed in Patent Document 3 uses a cathode active material represented by the composition formula: $Li_aNi_{1-b-c}M^1{}_bM^2{}_cO_2$ wherein $0.95 \leq a \leq 1.05$, $0.01 \leq b \leq 0.10$, $0.10 \leq c \leq 0.20$, $M^1$ is one or more elements selected from the group consisting of Al, B, Y, Ce, Ti, Sn, V, Ta, Nb, W and Mo, and $M^2$ is one or more elements selected from the group consisting of Co, Mn and Fe. The Li content of this cathode active material is represented by "a" with the range of $0.95 \leq a \leq 1.05$.

PRIOR ART

Patent Document

[Patent Document 1] JP-A-2010-47466
[Patent Document 2] JP-A-2006-332020
[Patent Document 3] JP-A-2000-323143

SUMMARY OF THE INVENTION

When a lithium ion secondary battery is in particular adopted for a battery for a plug-in hybrid electric vehicle, making low-cost, making low volume, weight saving, and making high power are desired with the high security that the production of fire or explosion of the battery is not caused due to exothermic reaction. For this reason, it is required that the lithium ion secondary battery is high in capacity and high in security, and a cathode material to satisfy such requirements is needed.

A cathode active material in a conventional lithium ion secondary battery can not achieve properties required for a battery for a plug-in hybrid electric vehicle, that is, high capacity and high security.

For example, like the cathode active material described in Patent Document 1, when the ratio of Li to a transition metal is in the range of 1.00 to 1.08, the decrease of capacity due to elemental substitution can not be sufficiently compensated. Furthermore, for example, with respect to the cathode active material described in Patent Document 2, when it is used in a large-sized battery used for a plug-in hybrid electric vehicle, the content of Ni in a transition metal layer has to be increased. However, the ratio of an element such as Mo to decrease heat generation to enhance securities is decreased. For this reason, the increase of heat generation is feared. Besides, the cathode active material described in Patent Document 3 can not sufficiently compensate the decrease of capacity due to elemental substitution.

It is an object of the present invention to provide a cathode active material and a cathode which can attain a lithium ion secondary battery with high capacity and high security, and further to provide the lithium ion secondary battery with high capacity and high security.

According to the present invention, the cathode active material is represented by the following composition formula:

wherein M1 represents Co, or Co and Mn; M2 represents Mo, W or Nb; $-0.07 \leq x \leq 0.1$; $0.6 \leq a \leq 0.9$; $0.05 \leq b \leq 0.38$; and $0.02 \leq c \leq 0.06$.

Other objects, features and advantages of the invention will become apparent from the following description of the embodiments of the invention taken in conjunction with the accompanying drawings.

ADVANTAGES OF THE INVENTION

According to the present invention, a cathode active material and a cathode which can attain a lithium ion secondary battery with high capacity and high security can be provided. Further, the lithium ion secondary battery with high capacity and high security can be provided.

DETAILED DESCRIPTION OF THE INVENTION

Figure 1:
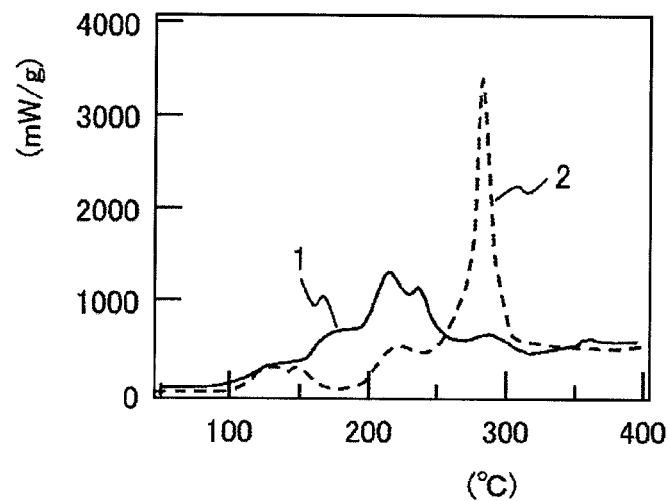
FIG. 1 shows the result of differential scanning calorimetry for prototype batteries in Example 1 and Comparative Example 1.

In order that a lithium ion secondary battery may be used as a battery for a plug-in hybrid electric vehicle, it requires the properties of high capacity and high security. In the lithium ion secondary battery, the properties are closely related to the property of a cathode material, specifically a cathode active material. In order to derive high capacity in a layered cathode active material represented by the composition formula: $LiMO_2$ wherein M represents a transition metal, it is necessary to increase the content of Ni in a transition metal layer.

However, a cathode active material having a large Ni content is low in structural stability in the state of charge. Therefore, when the temperature of battery is elevated due to internal short-circuit or the like, oxygen released from within a cathode reacts with an electrolyte at a relatively low temperature to cause a large exothermal reaction. The ignition and bursting of the battery due to this exothermal reaction are feared.

According to the present invention, the cathode active material solves such problems and is a composite oxide represented by the following composition formula:

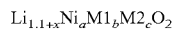

wherein M1 represents Co, or Co and Mn; M2 represents Mo, W or Nb; $-0.07 \leq x \leq 0.1$; $0.6 \leq a \leq 0.9$; $0.05 \leq b \leq 0.38$; and $0.02 \leq c \leq 0.06$.

The content of Ni in a transition metal layer is preferably 70% to 80% (0.7≤a≤0.8), while the content of M2 is preferably 3% to 5% (0.03≤c≤0.05).

The cathode according to the present invention uses the cathode active material represented by the above composition formula. Further, the lithium ion secondary battery according to the present invention comprises: a cathode capable of storing/releasing lithium; an anode capable of storing/releasing lithium; and a separator, wherein for the cathode, the cathode according to the present invention is used.

A cathode active material having a large Ni content provides high capacity, although it has the defect that it is low in thermal stability in the state of charge. Then, Mo, W or Nb has been added to a cathode active material having a large Ni content to improve the thermal stability in the state of charge. Each of Mo, W and Nb is an element which can decrease the maximum calorific value and enhance the thermal stability in the state of charge.

As compared with a cathode active material which has a large Ni content and includes no additional elements (Mo, W or Nb), a cathode active material according to the present invention remarkably decreases a calorific value when the cathode active material rises in temperature along with an electrolyte. Thus, the probability of catching fire and bursting when the battery rises in temperature can be reduced, while the security can be enhanced.

The use of the present cathode active material can provide a cathode for a lithium ion secondary battery which reduces the probability of catching fire and bursting when the battery rises in temperature, and enhances the security, and the lithium ion secondary battery.

Here, the content of Li in the cathode active material, that is, the ratio of Li to a transition metal ("1.1+x" in the above composition formula) is in the range of from 1.03 or more to 1.2 or less (−0.07≤x≤0.1). When the ratio is less than 1.03 (x<−0.07), the amount of Li in a Li layer is small to reduce the capacity. When the ratio is more than 1.2 (x>0.1), the amount of a transition metal in a composite oxide is decreased to reduce the capacity. A preferred Li content is in the range of 1.05 or more to 1.15 or less (−0.05≤x≤0.05).

The content of Ni in the cathode active material, which is represented by "a" in the above composition formula, is in the range of 0.6≤a≤0.9. When the content is a<0.6, the content of Ni mainly contributing to charge and discharge reactions is decreased to lower the capacity. When the content is a>0.9, the content of other elements (in particular M2) is decreased to lower the thermal stability. Preferably the content is 0.7≤a≤0.8.

The content of M1 in the cathode active material, which is represented by "b" in the above composition formula, is 0.05≤b≤0.38. When the content is b<0.05, the coulombic efficiency is decreased. When the content is b>0.38, the content of Ni mainly contributing to charge and discharge reactions is decreased to lower the capacity.

The content of M2 in the cathode active material, which is represented by "c" in the above composition formula, is 0.02≤c≤0.06. When the content is c<0.02, the thermal stability wherein the state of charge is low can not be improved. When the content is c>0.06, the structure of crystals becomes unstable to lower the capacity. Preferably the content is 0.03≤c≤0.05.

(Manufacture of Cathode Active Materials)

The manufacture method of cathode active materials in examples and comparative examples as described hereinafter will be described. In Examples and Comparative Examples, 29 sorts of cathode active materials were manufactured as described in Table 1 shown hereinafter.

As raw materials, nickel oxide and cobalt oxide were used. Further, according to compositions described in Table 1, one or two selected from the group consisting manganese dioxide, molybdenum oxide, tungsten oxide, niobium oxide, magnesium oxide, zirconium oxide and titanium oxide were used. These oxides were weighed so that a predetermined atom ratio could be derived, followed by adding purified water to form a slurry.

This slurry was pulverized by means of a beads mill of zirconia so that an average particle size becomes 0.2 μm. To this slurry, a polyvinyl alcohol (PVA) solution was added in an amount of 1 wt. % when converted into dry solids content, followed by mixing for further one hour, and thereafter granulation and drying were carried out by means of a spray dryer.

To the granulated particles, lithium hydroxide and lithium carbonate were added so that the ratio of Li to a transition metal becomes 1.1:1.

Then, powder derived by adding lithium hydroxide and lithium carbonate to the granulated particles was calcined at 750° C. for 10 hours, whereby crystals having a layer structure were formed. Thereafter, the crystals were ground to derive a cathode active material. Coarse particles having a particle size of 30 μm or more were removed by classifying, followed by using this cathode active material to manufacture a cathode.

A method of manufacturing a cathode active material according to the present invention is not limited to the above method, while other methods such as a coprecipitation method can be used.

(Manufacture of Cathode)

A method of manufacturing cathodes used in examples and comparative examples will be described. In Examples and Comparative Examples, cathode active materials selected from 29 sorts of ones manufactured as described previously were used to manufacture 29 sorts of cathodes.

A cathode active material and a carbonaceous electrical conducting agent were weighed to be 85:10.7 by mass ratio, followed by mixing the same using a mortar. A mixed material of the cathode active material and the electrical conducting agent and a binding agent which was dissolved in N-methyl-2-pyrolidone (NMP) were mixed to be 95.7:4.3 by mass ratio to form a slurry.

The uniformly mixed slurry was applied onto an aluminum collector foil having a thickness of 20 μm, and thereafter dried at 120° C., followed by compression molding by pressing so that the electrode density became 2.7 g/cm$^3$ to derive an electrode plate.

Thereafter, a disk having a diameter of 15 mm was punched out of the electrode plate to manufacture a cathode.

(Manufacture of Prototype Battery)

In Examples and Comparative Examples, cathodes selected from 29 sorts of ones manufactured as described previously were used to manufacture 29 sorts of prototype batteries.

An anode was manufactured by using metal lithium. As a nonaqueous electrolyte, one wherein LiPF$_6$ having a concentration of 1.0 mole/liter was dissolved in a mixed solvent of EC (ethylene carbonate) and DMC (dimethyl carbonate) having a volume ratio of 1:2 was used.

In Table 1, the composition ratio of metals in a cathode active material synthesized in Examples and Comparative examples was shown. In Table 1, the content of Li and the content of various transition metals are shown, provided that the total content of a cathode active material and transition metals is 100. In Examples and Comparative Examples, 29 sorts of cathode active materials of the cathode active materials Nos. 1 to 29 were manufactured.

TABLE 1

| | Composition | | | | | | | | | |
|---|---|---|---|---|---|---|---|---|---|---|
| | Li | Ni | Mn | Co | Mo | W | Nb | Mg | Zr | Ti |
| Cathode Active Material No. 1 | 110 | 80 | — | 16 | 4 | — | — | — | — | — |
| Cathode Active Material No. 2 | 103 | 80 | — | 16 | 4 | — | — | — | — | — |
| Cathode Active Material No. 3 | 106 | 80 | — | 16 | 4 | — | — | — | — | — |
| Cathode Active Material No. 4 | 109 | 80 | — | 16 | 4 | — | — | — | — | — |
| Cathode Active Material No. 5 | 112 | 80 | — | 16 | 4 | — | — | — | — | — |
| Cathode Active Material No. 6 | 115 | 80 | — | 16 | 4 | — | — | — | — | — |
| Cathode Active Material No. 7 | 120 | 80 | — | 16 | 4 | — | — | — | — | — |
| Cathode Active Material No. 8 | 110 | 70 | — | 26 | 4 | — | — | — | — | — |
| Cathode Active Material No. 9 | 110 | 60 | — | 36 | 4 | — | — | — | — | — |
| Cathode Active Material No. 10 | 110 | 80 | — | 16 | — | 4 | — | — | — | — |
| Cathode Active Material No. 11 | 110 | 80 | — | 16 | — | — | 4 | — | — | — |
| Cathode Active Material No. 12 | 110 | 80 | — | 18 | 2 | — | — | — | — | — |
| Cathode Active Material No. 13 | 110 | 80 | — | 14 | 6 | — | — | — | — | — |
| Cathode Active Material No. 14 | 110 | 80 | 2 | 14 | 4 | — | — | — | — | — |
| Cathode Active Material No. 15 | 110 | 80 | 4 | 12 | 4 | — | — | — | — | — |
| Cathode Active Material No. 16 | 110 | 80 | 6 | 10 | 4 | — | — | — | — | — |
| Cathode Active Material No. 17 | 110 | 80 | 8 | 8 | 4 | — | — | — | — | — |
| Cathode Active Material No. 18 | 105 | 60 | 20 | 20 | — | — | — | — | — | — |
| Cathode Active Material No. 19 | 105 | 50 | 20 | 30 | — | — | — | — | — | — |
| Cathode Active Material No. 20 | 100 | 60 | 20 | 20 | — | — | — | — | — | — |
| Cathode Active Material No. 21 | 110 | 60 | 20 | 20 | — | — | — | — | — | — |
| Cathode Active Material No. 22 | 110 | 50 | — | 46 | 4 | — | — | — | — | — |
| Cathode Active Material No. 23 | 100 | 80 | — | 16 | 4 | — | — | — | — | — |
| Cathode Active Material No. 24 | 125 | 80 | — | 16 | 4 | — | — | — | — | — |
| Cathode Active Material No. 25 | 110 | 80 | — | 16 | — | — | — | 4 | — | — |
| Cathode Active Material No. 26 | 110 | 80 | — | 16 | — | — | — | — | 4 | — |
| Cathode Active Material No. 27 | 110 | 80 | — | 16 | — | — | — | — | — | 4 |
| Cathode Active Material No. 28 | 110 | 80 | — | 20 | — | — | — | — | — | — |
| Cathode Active Material No. 29 | 110 | 80 | — | 12 | 8 | — | — | — | — | — |

In Examples 1 to 17 and Comparative Examples 1 to 12, as a cathode active material, the cathode active materials Nos. 1 to 29 were used one by one in number order to manufacture cathodes and prototype batteries, followed by carrying out charge and discharge tests and differential scanning calorimetries for the prototype batteries.

(Charge and Discharge Tests)

For a prototype battery, charge and discharge wherein the upper limit voltage was 4.3 v, and the lower limit voltage was 2.7 v at 0.1 C were repeated three times to initialize the same. Further, charge and discharge wherein the upper limit voltage was 4.3 v, and the lower limit voltage was 2.7 v at 0.1 C were carried out to measure a discharge capacity.

(Differential Scanning Calorimetries)

A prototype battery was charged to 4.3 v at a constant current/constant voltage, followed by cleansing a removed cathode with DMC. Subsequently, a disc having a diameter of 3.5 mm was punched out from the cathode, and injected into a sample pan, while an electrolyte was added thereto in an amount of 1 μl (microliter), followed by closely sealing the same to provide a sample.

When this sample was risen in temperature to 400° C. at a rate of 5° C./min., an exothermic behavior was examined.

In Tables 2 to 6, as the result of the charge and discharge tests and the differential scanning calorimetries in the examples 1 to 17 and the comparative examples 1 to 12, a capacity ratio and a maximum exothermic heat ratio are shown. Further, a cathode active material used and its composition are also shown.

In the result of the charge and discharge tests, with respect to Examples 1 to 7 and 10 to 17, and Comparative Examples 1, 3, 4 and 6 to 12, the value of a derived discharge capacity divided by the discharge capacity of Comparative Example 1 is defined as a capacity ratio, which is shown in Tables 2, 4, 5 and 6. With respect to Examples 8 and 9, and Comparative Examples 2 and 5, the value of a derived discharge capacity divided by the discharge capacity of Comparative Example 2 is defined as a capacity ratio, which is shown in Table 3.

In the result of the differential scanning calorimetries, with respect to Examples 1 to 7 and 10 to 17, Comparative Examples 1, 3, 4, 6 to 12, the maximum of the derived exothermic heat (maximum exothermic heat value) divided by the maximum exothermic heat value of Comparative Example 1 is defined as a maximum exothermic heat value ratio, which is shown in Tables 2, 4, 5 and 6. With respect to Examples 8 and 9, and Comparative Examples 2 and 5, the value of a derived maximum exothermic heat value divided by the maximum exothermic heat value of Comparative Example 2 is defined as a maximum exothermic heat value ratio, which is shown in Table 3.

TABLE 2

| | Capacity Ratio | Maximum Exothermic Heat Value Ratio | Cathode Active Material | Li | Ni | Mn | Co | Mo |
|---|---|---|---|---|---|---|---|---|
| Example 1 | 1.09 | 0.36 | 1 | 110 | 80 | — | 16 | 4 |
| Example 2 | 1.03 | 0.42 | 2 | 103 | 80 | — | 16 | 4 |
| Example 3 | 1.06 | 0.4 | 3 | 106 | 80 | — | 16 | 4 |
| Example 4 | 1.09 | 0.37 | 4 | 109 | 80 | — | 16 | 4 |
| Example 5 | 1.08 | 0.34 | 5 | 112 | 80 | — | 16 | 4 |
| Example 6 | 1.05 | 0.34 | 6 | 115 | 80 | — | 16 | 4 |
| Example 7 | 1.01 | 0.4 | 7 | 120 | 80 | — | 16 | 4 |
| Comp. Ex. 1 | 1 | 1 | 18 | 105 | 60 | 20 | 20 | — |
| Comp. Ex. 3 | 0.96 | 1.06 | 20 | 100 | 60 | 20 | 20 | — |
| Comp. Ex. 4 | 0.95 | 0.97 | 21 | 110 | 60 | 20 | 20 | — |
| Comp. Ex. 6 | 0.99 | 0.46 | 23 | 100 | 80 | — | 16 | 4 |
| Comp. Ex. 7 | 0.97 | 0.45 | 24 | 125 | 80 | — | 16 | 4 |

TABLE 3

| | Capacity Ratio | Maximum Exothermic Heat Value Ratio | Cathode Active Material | Li | Ni | Mn | Co | Mo |
|---|---|---|---|---|---|---|---|---|
| Example 8 | 1.08 | 0.46 | 8 | 110 | 70 | — | 26 | 4 |
| Example 9 | 1.04 | 0.51 | 9 | 110 | 60 | — | 36 | 4 |
| Comp. Ex. 2 | 1 | 1 | 19 | 105 | 50 | 20 | 30 | — |
| Comp. Ex. 5 | 0.97 | 0.56 | 22 | 110 | 50 | — | 46 | 4 |

TABLE 4

| | Capacity Ratio | Maximum Exothermic Heat Value Ratio | Cathode Active Material | Li | Ni | Mn | Co | W | Nb | Mg | Zr | Ti |
|---|---|---|---|---|---|---|---|---|---|---|---|---|
| Example 10 | 1.07 | 0.33 | 10 | 110 | 80 | — | 16 | 4 | — | — | — | — |
| Example 11 | 1.07 | 0.46 | 11 | 110 | 80 | — | 16 | — | 4 | — | — | — |
| Comp. Ex. 8 | 0.96 | 0.97 | 25 | 110 | 80 | — | 16 | — | — | 4 | — | — |
| Comp. Ex. 9 | 0.93 | 0.96 | 26 | 110 | 80 | — | 16 | — | — | — | 4 | — |
| Comp. Ex. 10 | 0.96 | 0.98 | 27 | 110 | 80 | — | 16 | — | — | — | — | 4 |

TABLE 5

| | Capacity Ratio | Maximum Exothermic Heat Value Ratio | Cathode Active Material | Li | Ni | Co | Mo |
|---|---|---|---|---|---|---|---|
| Example 12 | 1.11 | 0.59 | 12 | 110 | 80 | 18 | 2 |
| Example 13 | 1.02 | 0.39 | 13 | 110 | 80 | 14 | 6 |
| Comp. Ex. 11 | 1.1 | 1.16 | 28 | 110 | 80 | 20 | — |
| Comp. Ex. 12 | 0.96 | 0.42 | 29 | 110 | 80 | 12 | 8 |

TABLE 6

| | Capacity Ratio | Maximum Exothermic Heat Value Ratio | Cathode Active Material | Li | Ni | Mn | Co | Mo |
|---|---|---|---|---|---|---|---|---|
| Example 14 | 1.07 | 0.36 | 14 | 110 | 80 | 2 | 14 | 4 |
| Example 15 | 1.06 | 0.36 | 15 | 110 | 80 | 4 | 12 | 4 |
| Example 16 | 1.04 | 0.34 | 16 | 110 | 80 | 6 | 10 | 4 |
| Example 17 | 1.02 | 0.34 | 17 | 110 | 80 | 8 | 8 | 4 |

Table 2 will be explained. Table 2 is the one wherein Examples 1 to 7 are compared to Comparative Examples 1, 3, 4, 6 and 7. In Examples 1 to 7, the content of Li in a cathode active material is varied from 103 to 120, and as M1 of the composition formula which represents the cathode active material, Co is used, while as M2, Mo is used. Among transition metals, the content of Ni is 80%, the content of Co is 16%, and the content of Mo is 4%. With respect to a cathode active material in Comparative Examples 1, 3 and 4, the content of Ni of the transition metals is 60%, while M2 (Mo, W or Nb) of the composition formula is not contained. With respect to a cathode active material in Comparative Examples 6 and 7, the content of Ni is 80%, while as M2, Mo is included in amount of 4%, while the content of Li is 100% and 125%, respectively.

From Table 2, the result was obtained that as compared with Comparative Example 1, Examples 1 to 7 are large in discharge capacity and small in maximum exothermic heat value. It is considered that the reason why the discharge capacity shows a large value is that with respect to the cathode active materials used in each of Examples 1 to 7, the content of Ni in a transition metal layer is 80% which is large. Further, it is considered that the reason why the maximum exothermic heat value is small is that the element (Mo) which can enhance the thermal stability in the state of charge existed in an amount of 4% in a transition metal layer.

On the other hand, in Comparative Examples 3, 4, 6 and 7, an enhancement in discharge capacity could not be consistent with a decrease in maximum exothermic heat value. In Comparative Example 3, the discharge capacity was decreased, because the content of Li was 100% which is small. In Comparative Example 4, which is a case wherein the content of Li is 110% and M2 is not included, the discharge capacity was decreased. It is considered that this is because the content of Li is large, and thus Li is not incorporated in a crystal and does not concern charge or discharge. On the other hand, in Example 1 the content of Li is 110%, while the discharge capacity is large. For this reason, it is found that when M2 is included, it is excellent to have a large Li content. In Comparative Example 6, the content of Li is 100% which is small, and thus the discharge capacity is decreased. In Comparative Example 7, the content of Li is 125% which is large, and Mo as M2 includes 4%, while the discharge capacity was decreased. For this reason, it is found that even if M2 is included, when the content of Li is too large, Li is not incorporated in a crystal, and thus the discharge capacity is decreased.

From the above descriptions, it has been found that when the content of Li in a cathode active material is set to be 103% to 120%, and Mo is used as M2 of the composition formula to be included in an amount of 4% of transition metals, the enhancement of discharge capacity can be consistent with the decrease of maximum exothermic heat value.

Table 3 will be explained. Table 3 is the one wherein Examples 8 and 9 are compared with Comparative Examples 2 and 5. In Examples 8 and 9, the content of Li in a cathode active material is set to be 110%, Co is used as M1 of the composition formula, which represents a cathode active material, while Mo is used as M2. The content of Ni of transition metals is 70% in Example 8, while 60% in Example 9. The content of Co is 26% in Example 8, while 36% in Example 9. The content of Mo is 4% in both examples. With respect to cathode active materials in Comparative Example 2, the content of Ni of transition metals is 50%, while M2 (Mo, W or Nb) of the composition formula is not included. With respect to cathode active materials in Comparative Example 5, the content of Ni is 50%, while Mo as M2 of the composition formula is included in amount of 4%.

From Table 3, the result was obtained that as compared with Comparative Example 2, Examples 8 and 9 are large in discharge capacity and small in maximum exothermic heat value. It is considered that the reason why the discharge capacity was a large value is that with respect to cathode active materials used in Examples 8 and 9, the contents of Ni existing in a transition metal layer in Examples 8 and 9 are 70% and 60%, respectively which are large. Further, it is considered that the reason why the maximum exothermic heat value is small is that Mo, which can enhance thermal stability in the state of charge, existed in an amount of 4% in a transition metal layer.

On the other hand, in Comparative Example 5, the enhancement in discharge capacity could not be consistent with the decrease in maximum exothermic heat value. In Comparative Example 5, the maximum exothermic heat value was decreased because Mo as M2 was included in an amount of 4%, while the discharge capacity was decreased because the content of Ni was 50% which is small.

From the above descriptions, it has been found that when as M2 of the composition formula, Mo of transition metals was included in amount of 4%, if the content of Ni existing in a transition metal layer in a cathode active material is set to be 60% or more, the enhancement in discharge capacity can be consistent with the decrease in maximum exothermic heat value.

Table 4 will be explained. Table 4 is the one wherein Examples 10 and 11 are compared with Comparative Examples 8 to 10. In Examples 10 and 11, the content of Li in a cathode active material is set to be 110%, Co is used as M1 of the composition formula. The content of Ni of transition metals is 80%, while the content of Co is 16%. Further, as M2 of the composition formula, which represents a cathode active material, Example 10 uses W, while Example 11 uses Nb. The content of each of W and Nb of transition metals is 4%. With respect to cathode active materials in Comparative Examples 8 to 10, the content of each of Li, Ni and Co is the same as in Example 10 and 11, while as M2, Comparative Example 8 uses Mg, Comparative Example 9 uses Zr, and Comparative Example 10 uses Ti.

From Table 4, the result was obtained that as compared with Comparative Example 1, Examples 10 and 11 are large in discharge capacity and small in maximum exothermic heat value. It is considered that the reason why the discharge capacity was a large value is that with respect to cathode active materials used in Examples 10 and 11, the content of Ni existing in a transition metal layer is 80% which is large. Further, it is considered that the reason why the maximum exothermic heat value is small is that an element (W or Nb), which can decrease a maximum exothermic heat value and enhance thermal stability in the state of charge, existed in an amount of 4% in a transition metal layer.

On the other hand, in Comparative Examples 8 to 10, the enhancement in discharge capacity could not be consistent with the decrease in maximum exothermic heat value. As compared with Comparative Example 1, in Comparative Examples 8 to 10, the maximum exothermic heat value decreased merely in an amount of several percent. A cathode active material in Comparative Examples 8 to 10 includes Mg, Zr or Ti, although Mo, W or Nb is not included which can decrease the maximum exothermic heat value, and thus the maximum exothermic heat value can not be decreased. A cathode active material in Examples 10 and 11 and Examples 1 to 7 includes MO, W or Nb, and thus the maximum exothermic heat value is decreased in amount of 50% or more.

From the above descriptions, it has been found that when a cathode active material includes Mo, W or Nb, the maximum exothermic heat value can be decreased, the discharge capacity also can be enhanced. Accordingly, even if as M2 of the composition formula, W or Nb is included, both of the decrease of a maximum exothermic heat value and the enhancement of a discharge capacity can be accomplished as in the case wherein Mo is included as M2.

Table 5 will be explained. Table 5 is the one wherein Examples 12 and 13 are compared with Comparative Examples 11 to 12. In each of Examples or Comparative Examples, the content of Li in a cathode active material is set to be 110%, Co is used as M1 of the composition formula which represents a cathode active material, while the content of Ni of transition metals is 80%. In Examples 12 and 13 and Comparative Example 12, Mo is used as M2 of the composition formula which represents a cathode active material, while Comparative Example 11 does not include M2. The content of Mo of transition metals is 2% in Example 12, 6% in Example 13, while 8% in Comparative Example 12.

From Table 5, the result was obtained that as compared with Comparative Example 1, Examples 12 and 13 are large in discharge capacity and small in maximum exothermic heat value. It is considered that the reason why the discharge capacity was a large value is that with respect to cathode active materials used in Examples 12 and 13, the content of Ni existing in a transition metal layer is 80% which is large. Further, it is considered that the reason why the maximum exothermic heat value is small is that Mo, which can enhance thermal stability in the state of charge, existed in an amount of 2% or 6% in a transition metal layer.

On the other hand, in Comparative Examples 11 and 12, the enhancement in discharge capacity could not be consistent with the decrease in maximum exothermic heat value. The cathode active material in Comparative Example 11 does not include Mo, which can decrease a maximum exothermic heat value, and thus the maximum exothermic heat value can not be decreased. The cathode active material in Comparative Example 12 includes Mo, which does not concern charge and discharge, in an amount of 8% which is large, and thus the discharge capacity was decreased.

From the above descriptions, it has be found that the content of Mo used to decrease a maximum exothermic heat value is preferably 2 to 6% of transition metals when the result of Examples 1 to 9 is also considered. Incidentally, as can be seen also from the results of Examples 10 and 11, W or Nb may be used in place of Mo, and thus it is found that the content of M2 (Mo, W or Nb) of the composition formula for a cathode active material is preferably 2 to 6% of transition metals.

Table 6 will be explained. Table 6 is the one wherein Examples 14 to 17 are compared with each other. In each of Examples 14 to 17, the content of Li in a cathode active material is set to be 110%, the content of Ni of transition metals is 80%, Mn and Co are used as M1 of the composition formula which represents a cathode active material, while Mo was used as M2. In Examples 1 to 13, merely Co was used as M1, while in Examples 14 to 17, a part of this Co is replaced with Mn. In Examples 14 to 17, the content of Mn is 14%, 12%, 10% and 8%, respectively. The content of Mo is 4% in each of Examples 14 to 17.

From Table 6, the result was obtained that as compared with Comparative Example 1, Examples 14 and 17 are large in discharge capacity and small in maximum exothermic heat value. It is considered that the reason why the discharge capacity was a large value is that with respect to cathode active materials used in Examples 14 to 17, the content of Ni existing in a transition metal layer is 80% which is large. Further, it is considered that the reason why the maximum exothermic heat value is small is that Mo, which can enhance thermal stability in the state of charge, existed in an amount of 4% in a transition metal layer.

From the above descriptions, it has been found that even when as M1 of the composition formula which represents a cathode active material, Mn and Co are used, as M2, Mo is used, the enhancement in discharge capacity can be consistent with the decrease in maximum exothermic heat value. Incidentally, as can be seen from the result of Examples 10 and 11, as M2, W or Nb can be used in place of Mo.

From the results shown in Tables 2 to 6, it has been found that when the content of Li in a cathode active material is set to be 103% to 120%, the content of Ni in a transition metal layer is set to be 60% to 80%, as M1 of the composition formula which represents the cathode active material, Co is used or Mn and Co are used, the content of M1 in the transition metal layer is set to be 16% to 36%, as M2 of the composition formula, Mo, W or Nb is used, and the content of M2 in the transition metal layer is set to be 2% to 6%, the enhancement in discharge capacity can be consistent with the decrease in maximum exothermic heat value.

The preferable content of Li is in the range of 105% to 115%. The content of Ni can be increased in such range as the thermal stability does not decrease, and can be set to be 60% to 90%. The preferable content of Ni is in the range of 70% to 80%. The content of M1 can be decreased in such range as the crystal structure does not become unstable, and can be increased in such a range as the content of Ni is decreased not to lower discharge capacity. For this reason, the content of M1 can be set to be in the range of 5% to 38%. The preferable content of M2 is in the range of 3% to 5%.

FIG. 1 is a graph showing the result of differential scanning calorimetry for prototype batteries in Example 1 and Comparative Example 1. The horizontal axis shows temperature, while the vertical axis shows heat flow, while the result according to Example 1 is shown by the sign "1", and the result according to Comparative Example 1 is shown by the sign "2". As can be seen from FIG. 1, a prototype battery according to Example 1 is totally small in calorific value as compared with a prototype battery according to Comparative Example 1. For this reason, it is found that the cathode active material "1" used in Example 1 is smaller in maximum exothermic heat value due to a exothermic reaction and higher in stability than the cathode active material "18" used in Comparative Example 1.

Figure 2:
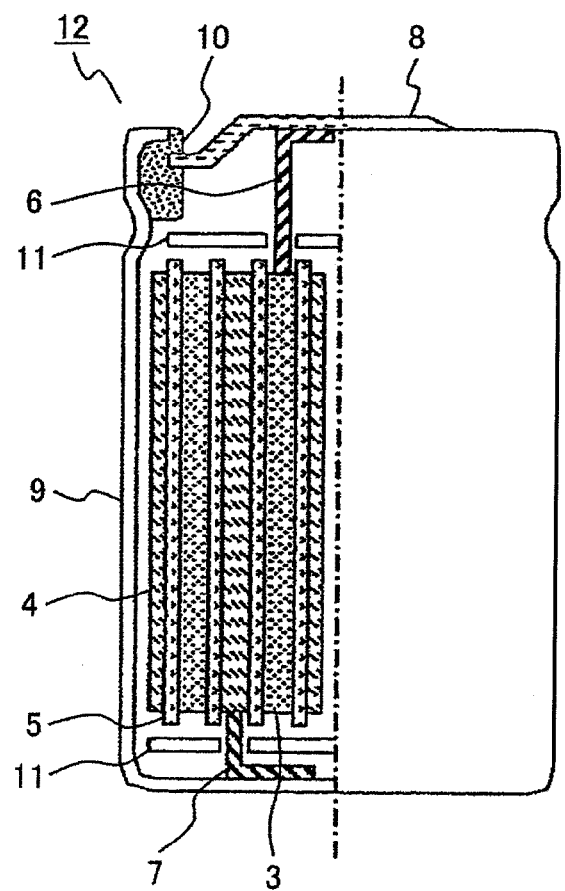
FIG. 2 is a sectional drawing of a lithium ion secondary battery.

FIG. 2 is a sectional drawing of a lithium ion secondary battery according to the present invention. The lithium ion secondary battery "12" shown in FIG. 2 comprises an electrode group comprising a cathode plate "3" wherein a cathode material is applied on both sides of a collector, an anode plate "4" wherein an anode material is applied on both sides of a collector, and a separator "5". According to the present Examples, the cathode plate "3" and the anode plate "4" are wound through the separator "5" to form the electrode group of a winding body. This winding body is inserted into a battery canister "9".

The anode plate "4" is electrically connected to the battery canister "9" through an anode lead piece "7". To the battery canister "9", a closed cap portion "8" is attached through a packing "10". The cathode plate "3" is electrically connected to the closed cap portion "8" through a cathode lead piece "6". The winding body is insulated with an insulating plate.

Incidentally, the electrode group does not have to be such a winding body as shown in FIG. 2, while it may be a layered product wherein the cathode plate "3" and the anode plate "4" are layered through the separator "5".

As the cathode plate "3" of the lithium ion secondary battery "12", a cathode manufactured by applying a cathode material comprising a cathode active material shown according to the present Examples can be used to derive a lithium ion secondary battery having high capacity and high security. Therefore, according to the present invention, a cathode active material, a cathode and a lithium ion secondary battery which can attain high capacity, high output and high security required for a battery for a plug-in hybrid electric vehicle can be provided.

It should be further understood by those skilled in the art that although the foregoing description has been made on embodiments of the invention, the invention is not limited thereto and various changes and modifications may be made without departing from the spirit of the invention and the scope of the appended claims.

INDUSTRIAL APPLICABILITY

The present invention can be utilized for a cathode active material and a cathode for a lithium ion secondary battery, and the lithium ion secondary battery, and in particular for a lithium ion secondary battery for a plug-in hybrid electric vehicle.

DESCRIPTION OF REFERENCE NUMERALS

1: the result of differential scanning calorimetry for a prototype battery according to Example 1,
2: the result of differential scanning calorimetry for a prototype battery according to Comparative Example 1,
3: cathode plate,
4: anode plate,
5: separator,
6: cathode lead piece,
7: anode lead piece,
8: closed cap portion,
9: battery canister,
10: packing,
11: insulating plate, and
12: lithium ion secondary battery.

The invention claimed is:

1. A cathode active material, which is represented by the following composition formula:

$$Li_{1.1+x}Ni_aM1_bM2_cO_2$$

wherein M1 represents Co, or Co and Mn; M2 represents Mo or W; $-0.07 \le x \le 0.1$; $0.6 \le a \le 0.9$; $0.05 \le b \le 0.38$; and $0.02 \le c \le 0.06$, and
wherein $a/c > 12.5$.

2. The cathode active material according to claim 1, wherein $0.7 \le a \le 0.8$.

3. The cathode active material according to claim 1, wherein $-0.05 \le x \le 0.05$.

4. The cathode active material according to claim 1, wherein $0.03 \le c \le 0.05$.

5. A cathode, which uses the cathode active material according to claim 1.

6. A lithium ion secondary battery comprising:
a cathode capable of storing/releasing lithium;
an anode capable of storing/releasing lithium; and
a separator,
wherein said cathode is the cathode according to claim 5.

7. The cathode active material according to claim 1, wherein as M2 Nb is further contained.

8. A cathode active material, which is represented by the following composition formula:

$$Li_{1.1+x}Ni_aM1_bM2_cO_2$$

wherein M1 represents Co, or Co and Mn; M2 represents Mo or W; $-0.07 \leq x \leq 0.1$; $0.6 \leq a \leq 0.9$; $0.05 \leq b \leq 0.38$; and $0.02 \leq c \leq 0.06$, and
wherein $a/c > 13.3$.

9. The cathode active material according to claim 8, wherein as M2 Nb is further contained.

* * * * *